(12) United States Patent
Eiler et al.

(10) Patent No.: US 7,765,072 B2
(45) Date of Patent: Jul. 27, 2010

(54) BUILDING PROTECTION SYSTEM AND METHOD

(75) Inventors: Greg G. Eiler, Walnut Creek, CA (US); Jason B. Poggi, Oakley, CA (US)

(73) Assignee: Building Protection Systems, Inc., San Francisco, CA (US)

( * ) Notice: Subject to any disclaimer, the term of this patent is extended or adjusted under 35 U.S.C. 154(b) by 651 days.

(21) Appl. No.: 11/729,315

(22) Filed: Mar. 27, 2007

(65) Prior Publication Data

US 2008/0015794 A1  Jan. 17, 2008

Related U.S. Application Data

(63) Continuation-in-part of application No. 11/242,297, filed on Oct. 3, 2005, now Pat. No. 7,484,668.

(51) Int. Cl.
*G01N 31/00* (2006.01)
(52) U.S. Cl. .................................................... 702/31
(58) Field of Classification Search .................. 702/19, 702/31; 340/539.26, 588; 250/330; 236/49.3
See application file for complete search history.

(56) References Cited

U.S. PATENT DOCUMENTS

| | | | |
|---|---|---|---|
| 4,380,187 A | 4/1983 | Wicks | 98/39 |
| 4,960,041 A | 10/1990 | Kiser | 98/1.5 |
| 5,215,499 A | 6/1993 | Eberhardt | 454/256 |
| 5,462,485 A | 10/1995 | Kinkead | 454/256 |
| 5,720,659 A | 2/1998 | Wicks | 454/256 |
| 6,072,397 A * | 6/2000 | Ostrowski | 340/588 |
| 6,293,861 B1 | 9/2001 | Berry | 454/255 |
| 2004/0064260 A1* | 4/2004 | Padmanabhan et al. | 702/19 |
| 2005/0190058 A1* | 9/2005 | Call | 340/539.26 |
| 2007/0075244 A1* | 4/2007 | Kerr | 250/330 |

FOREIGN PATENT DOCUMENTS

| | | |
|---|---|---|
| DE | 27 43 107 | 4/1979 |
| WO | WO 01/18457 A1 | 3/2001 |
| WO | WO 2006/083323 A2 | 8/2006 |

OTHER PUBLICATIONS

PCT Search report and written opinion mailed Jul. 8, 2008 for a foreign counterpart of U.S. Appl. No. 11/242,297 from which this patent application takes priority.
Office Action for U.S. Appl. No. 11/242,297, Apr. 17, 2008.
European Search Report, Sep. 22, 2009.

* cited by examiner

*Primary Examiner*—Tung S Lau
*Assistant Examiner*—Xiuquin Sun
(74) *Attorney, Agent, or Firm*—Michael B. Einschlag

(57) ABSTRACT

A building protection system includes chemical sensor systems to detect chemicals in inlet and return air; radiological sensor systems to detect radioactive materials in the inlet and return air; and a control system (a) to signal a building control system to close dampers and to turn off a fan system when more than predetermined levels of a chemical or radioactive material is detected and (b) to issue reports.

2 Claims, 2 Drawing Sheets

BUILDING PROTECTION SYSTEM AND METHOD

This patent application is a continuation-in-part of a U.S. patent application having Ser. No. 11/242,297 that was filed on Oct. 3, 2005, and which issued as U.S. Pat. No. 7,484,668, which U.S. patent application is incorporated herein in its entirety.

TECHNICAL FIELD OF THE INVENTION

One or more embodiments of the present invention relate to a building protection system and method.

BACKGROUND OF THE INVENTION

Currently, commercial office buildings and areas outside the commercial office buildings do not have adequate protection against contaminants such as chemical, biological, nerve and nuclear agents that terrorists can obtain in the open market. For example, chlorine and bromine gases can be purchased at pool supply outlets, and cyanide pellets can be purchased as jeweler's cleaning agents. If contaminates such as these are released into a building's heating, ventilation and air conditioning ("HVAC") system there may not be any perception of danger by potential victims within the building until it is too late. For example, in the case of cyanide, just a little bit can kill you (166 ppm—LD 50).

In the past, concerns have arisen about combustion-based pollutants in air supplied to a building's HVAC system where motor vehicles operate close to its air intakes. A building protection system for such pollutants is shown in U.S. Pat. No. 5,462,485 where, to avoid toxic levels of combustion-based pollutants, the disclosed building protection system varies an amount of outside air drawn into a building in response to a concentration of such combustion-based pollutants in a stream of outside air entering the building's air intake.

Building protection systems have been developed to respond to emergency conditions caused by the presence of smoke or similar harmful gases in buildings. For example, U.S. Pat. Nos. 4,380,187 and 5,720,659 disclose using plumbing to provide life supporting oxygen to bathrooms within a building under pressure); U.S. Pat. No. 4,960,041 discloses using vents and return air to exhaust an interior of a building; U.S. Pat. No. 5,215,499 discloses using water powered fans to pressurize individual safe spaces in a building to purge contaminates in localized areas; U.S. Pat. No. 6,293,861 discloses using pressurized air to purge a building of contaminants after they are sensed in the building; and German Patent No. 27 43 107 discloses cutting off inlet air to an HVAC system when contaminants are detected in an inlet air stream.

In addition to the issues discussed above, there are also similar concerns relating to areas surrounding the outside of commercial office buildings, government buildings, central business districts (CBD's), arenas, stadiums, business campuses, and other, general indoor and outdoor gathering places where chemical, biological, nerve or radiological agents can be released to be drawn into a building's HVAC system or affect people moving in or through such outdoor areas.

In light of the above, there is a need in the art for systems and methods that address one or more of the above-identified problems.

SUMMARY OF THE INVENTION

One or more embodiments of the present invention solve one or more of the above-identified problems. In particular, one embodiment of the present invention is a building protection system that is responsive to the presence of hazardous agents (for example and without limitation, chemical, biological, nerve or blood agents, chemical warfare agents, toxic industrial chemicals, combustibles, oxygen and/or nuclear airborne agents) in air streams of a building's heating, ventilation and air conditioning ("HVAC") system. Specifically, one such embodiment of the present invention is a building protection system for protecting a building from one or more of chemical, biological, nerve and nuclear agents by detecting their presence in real time, and in response, rapidly causing fans to be shut off to avoid further contamination of the building and/or injury to occupants of the building. In accordance with one such embodiment, an array of sensors is disposed, for example and without limitation, in (or in accordance with one or more further embodiments of the present invention, adjacent to) the building's dampers (for example, and without limitation, both inlet air and return air dampers), and a control system operates to send a signal to the building's existing control system whenever contaminates are sensed by the sensors in air streams in the building to cause the building's existing control system: (a) to close the building's dampers (thereby closing off the inlet air stream and the return air stream to the HVAC system); and (b) to turn off the fans.

Still further, in accordance with one such still further embodiment of the present invention, a building protection system for protecting a building from chemical biological, nerve and nuclear agents uses a network or array of "paired" sensors for each agent to be sensed, wherein parity of responses for "paired" sensors is determined before activating a shut down of the building's HVAC system. In accordance with one such embodiment, the sensors operate in real time, and they are "paired" so that lack of parity of responses for "paired" sensors will: (a) prevent false positives (thereby preventing an unnecessary shut down of the building's HVAC system); and (b) identify sensor failure (where a lack of parity of responses for the "paired" sensors indicates that a sensor fault has occurred).

Yet still further, in accordance with one such yet still further embodiment of the present invention, if the control system detects a sensor failure or fault or lack of parity between two paired sensors, the operation of the control system can be adjusted or reconfigured, either locally or remotely, so that one sensor of a "pair" of sensors, can be operable to enable the control system to cause a fan system to be turned off, and to cause dampers to be closed whenever that sensor detects a toxic contaminant.

Yet still further, in accordance with one such yet still further embodiment of the present invention, chemical and radiological sensors self adjust for temperature and calibration drift. In accordance with one or more such embodiments, (a) chemical sensors that self adjust for temperature and calibration drift can be purchased from Building Protection Systems, Inc. of San Francisco, Calif. or from RKI Instruments of Union City, Calif.; and (b) radiological sensors that self adjust for temperature and calibration drift can be purchased from Building Protection Systems, Inc. of San Francisco, Calif. or from BNC Corporation of San Rafael, Calif.

Yet still further, in accordance with one such yet still further embodiment of the present invention, a building protection system: (a) employs optional video monitors to observe and record data from areas of access to the building protection system; and (b) reports such video data to a remote location when unauthorized personnel attempt to access the system or the normal operation of the system is modified at the building.

Since most commercial HVAC systems use return air as part of a total air circulation system, to avoid injury from toxic materials entering a building, both an incoming air stream (the "outside air stream") and an air stream which is re-circulated (the "return air stream") should be monitored, for example, toxic materials may be released within a building and only be present in the return air stream. Advantageously, one or more embodiments of the present invention are capable of simultaneously responding to multiple airborne contaminants found in the incoming air stream and/or in the return air stream (i.e., an air stream which re-circulated in a building). In accordance with one or more further embodiments of the present invention, such multiple contaminants may be, for example and without limitation, one or more from the following group: chlorine, arsine, sulfur dioxide, ammonia, hydrogen cyanide, hydrogen sulfide, nitric oxide, nitrogen dioxide. Further, in accordance with one or more yet further embodiments, radiological sensors provide an addition level of protection by responding to radioactive agents.

DETAILED DESCRIPTION

Figure 1:
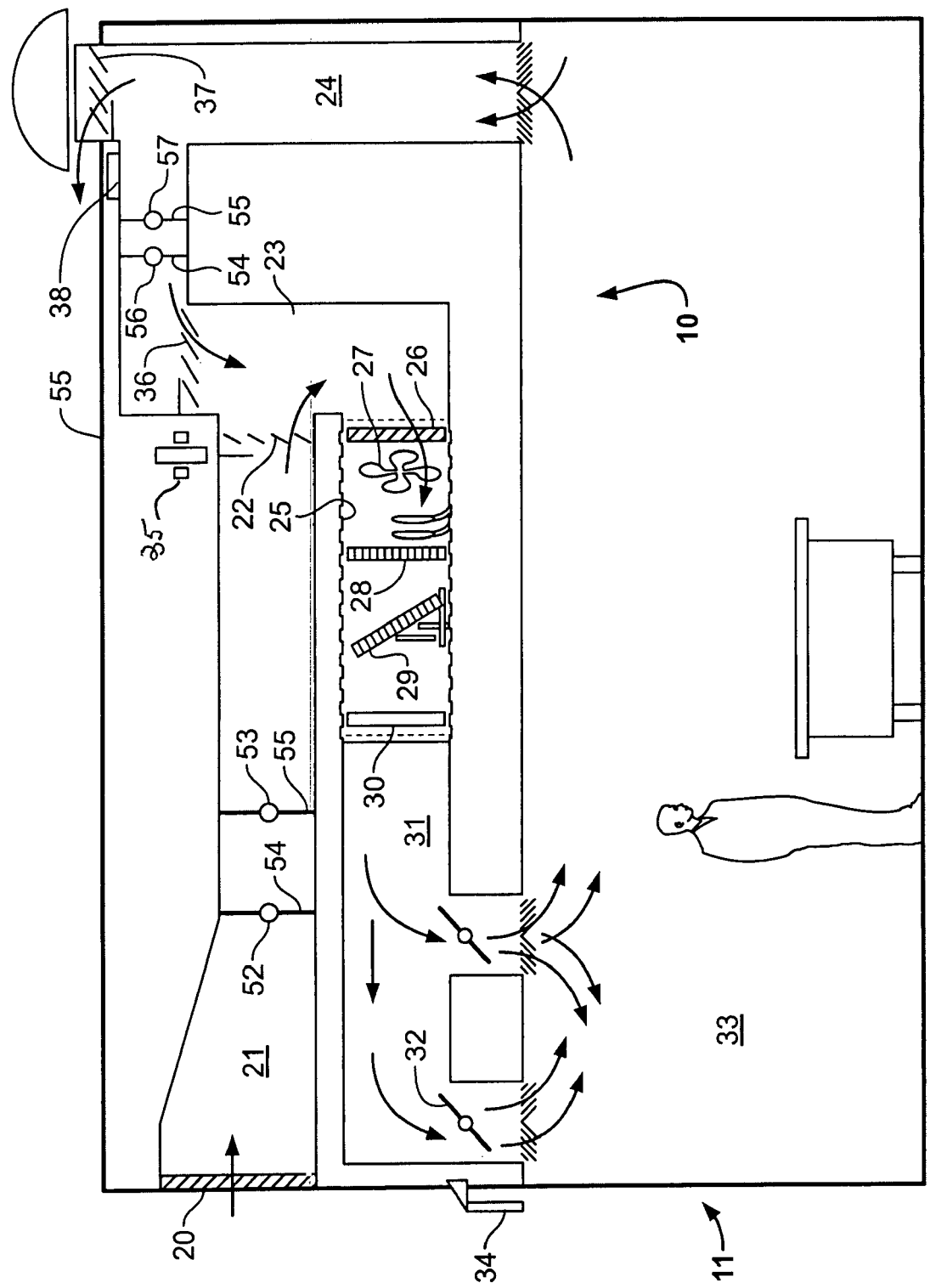
FIG. 1 is a diagram of a building that shows typical components of a conventional heating, ventilation and air conditioning ("HVAC") system to which sensors (also referred to as sensor systems) have been added in accordance with one or more embodiments of the present invention.

FIG. 1 is a diagram of building 11 that shows typical components of conventional heating, ventilation and air conditioning ("HVAC") system 10 to which sensors (also referred to as sensor systems) have been added in outdoor air inlet duct(s) and return air duct(s) in accordance with one or more embodiments of the present invention. As shown in FIG. 1, typical components of ("HVAC") system 10 include: (a) outdoor air intake 20; and (b) inlet air duct 21 that leads to outdoor air damper 22—outdoor air damper 22 is capable of closing off inlet air duct 21. When outdoor air damper 22 is open, an outside air stream flows into economizer 23 where it is mixed with a building return air stream from return air duct 24 of building 11. As is well known to those of ordinary skill in the art, the outside air stream and the building return air stream are mixed in economizer 23 to reduce mechanical cooling or heating of the outside air stream, as well as, to maintain a minimum level of fresh air, as mandated by government regulation. Past government regulation required up to 20% fresh air (from the outside air stream) be utilized at all times. As is also well known to those of ordinary skill in the art, when carbon dioxide ($CO_2$) monitors are present in building 11, fresh air demand can be based on $CO_2$ levels instead of a fixed percentage of total air being circulated. Using a lower percentage of outside air can reduce energy consumption under certain conditions by limiting the amount of outside air needed to dilute $CO_2$ levels, and by reducing the amount of heating or cooling of a mixed air stream leaving economizer 23.

As further shown in FIG. 1, the mixed air stream output from economizer 23 passes through filter 26 into supply duct 25—the mixed air stream is drawn into supply duct 25 by supply fan system 27. As further shown in FIG. 1, supply fan system 27 drives the mixed air stream through heating coils 28, cooling coils 29, and then through humidifier 30. As further shown in FIG. 1, after the mixed air stream leaves humidifier 30, it passes into distribution duct 31 of building 11 where it passes through air diffusers 32 and into occupied spaces 33. Although multiple personnel spaces exist in most buildings, for purposes of illustration, only one personnel space is shown in FIG. 1.

As further shown in FIG. 1, actuator 35 controls outside air damper 22 and damper 36. Damper 36 determines an amount of the building return air stream that is mixed with outside air stream in economizer 23. As further shown in FIG. 1, exhaust damper 37, under the control of actuator 38, provides a mechanism to vent a portion of the building return air stream not used in economizer 23, which portion is replaced with air supplied by the outside air stream. As is well known to those of ordinary skill in the art, for HVAC system 10 to operate, fan system 27 must create a positive pressure in supply duct 25 and distribution duct 31 to circulate air streams throughout building 11.

Figure 2:
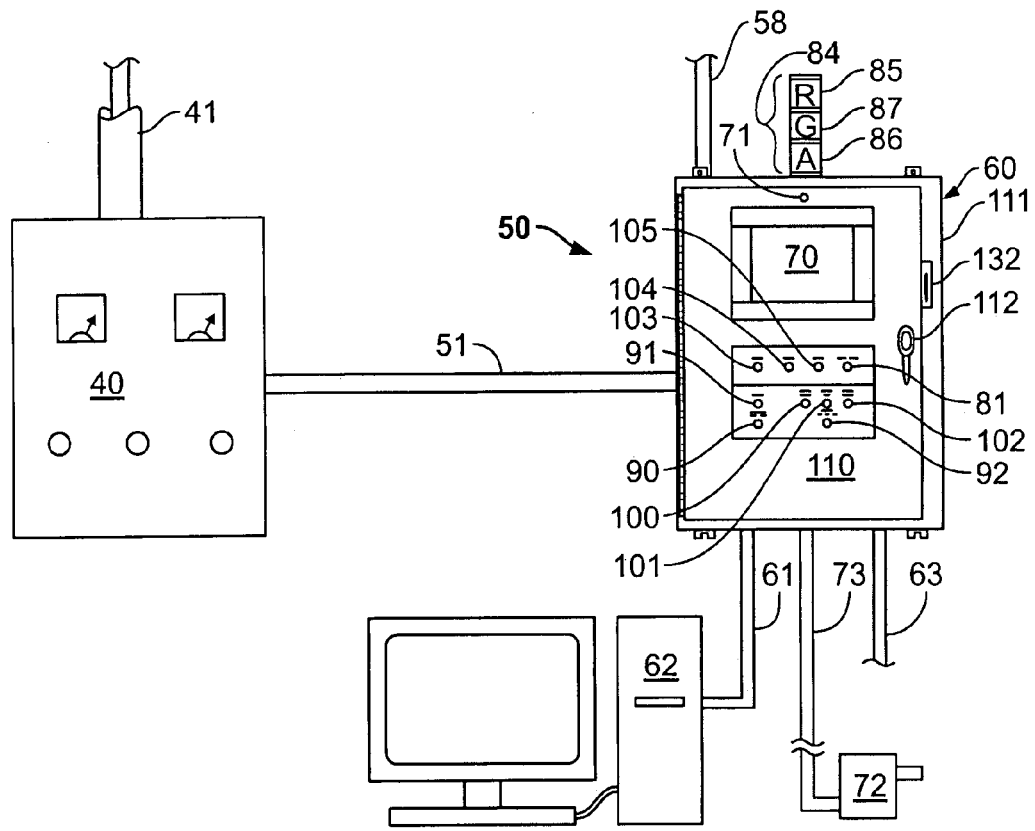
FIG. 2 is a diagram of a conventional building control system in communication with a building protection system that is fabricated in accordance with one or more embodiments of the present invention to control the HVAC system of a building when a threat occurs.

FIG. 2 is a diagram of conventional building control system 40 (also referred to as HVAC control system 40) in communication with building protection system 50 that is fabricated in accordance with one or more embodiments of the present invention to control HVAC system 10 of building 11 when a threat occurs. As is well known to those of ordinary skill in the art, building control system 40 shown in FIG. 2, sometimes referred to as a "Building HVAC Management System" ("BMS") or a building control system, directs operation of the above-described components of HVAC system 10 on the basis of temperature, humidity and pressure. In addition, and as is also well known to those of ordinary skill in the art, fire, security and lighting functions may also be integrated into building control system 40.

As is well known to those of ordinary skill in the art, building control system 40 typically comprises controllers that communicate with sensors and actuators sensors to direct action of components of HVAC system 10. In accordance with one or more embodiments of the present invention, the above-described components of HVAC system 10 communicate with building control system 40 using wiring 41 (refer to FIG. 2). However, those of ordinary skill in the art will appreciate that further embodiments of the present invention exist wherein such communication occurs utilizing any one of a number of communication mechanisms, including those that are well known to those of ordinary skill in the art.

Since a typical version of building control system 40 comprises programmable controllers, direct digital control program code may be used to control the operation of the above-described components of HVAC system 10. As is well known to those of ordinary skill in the art, such programs may be used to control time schedules, set-points, logic, timers, trend logs, alarms, and so forth. Typically, building control system 40 receives analog inputs and digital inputs. Analog inputs are typically a voltage or current measurement from variable sensing devices used to control proportional movements of components (for example and without limitation, valves, dampers, motor speed, and so forth) in steps or degrees (for example, outside air temperature from temperature sensor 34 or temperature sensor system 34 shown in FIG. 1), and digital inputs are typically (dry) contacts from a control device.

In addition, and as is well known to those of ordinary skill in the art, a typical version of building control system 40 communicates with one or more personal computers that are used as a building engineer's, a facility operator's, or a management interface. In further addition, some versions of building control system 40 use Ethernet links, dial up modems, wireless or other communication mechanisms to communicate with controllers in a manner that enables building operators to access these controllers remotely from inside or outside the building using a web browser or other forms of communication interface.

Building protection system 50 shown in FIG. 2 is fabricated in accordance with one or more embodiments of the present invention. Building protection system 50 is designed to interface with building control system 40, and to send appropriate signals to building control system 40 through, for example and without limitation, hardwired connection 51 whenever: (a) a threat to building 11 is detected in the outside air stream entering building 11; or (b) a threat to building 11 is detected in the return air stream entering economizer 23. In accordance with one or more such embodiments of the present invention, these signals can be generated by closing or opening contacts of alarm modules of building protection system 50 that communicate with building control system 40. As those of ordinary skill in the art will readily appreciate, further embodiments of the present invention exist wherein such communication occurs utilizing any one of a number of communication mechanisms, including those that are well known to those of ordinary skill in the art.

In accordance with one or more embodiments of the present invention, building control system 40 is programmed to provide override for normal building shut down procedures, and to respond to a signal from building protection system 50 by immediately (i.e., as quickly as possible) shutting down HVAC system 10 of building 11.

Building control system 40 has conventional shut down procedures which typically involve, for example and without limitation, a sequence of first turning off mechanical cooling devices and pumps, then a cooling tower, and then supply and return fans together. Such sequences can be as short as 2 minutes, or as long as one (1) hour. As a result, air stream flow in HVAC system 10 during such a conventional shut down procedure, is not actually stopped, but is merely slowed down as the sequence proceeds. However, if toxic agents are sensed, safety considerations require a shut down in seconds, not minutes. Thus, when employing one or more embodiments of the present invention, building control system 40 is programmed, for example and without limitation, with a subprogram that causes an immediate shut down of components of HVAC system 10 whenever a "shut down" signal is received from building protection system 50.

Referring to FIG. 1, building 11—to be protected in accordance with one or more embodiments of the present invention—has chemical/gas sensor system(s) and nuclear/radiation sensor system(s) located in (or in accordance with one or more further embodiments of the present invention, adjacent to) all air inlets and return air ducts of HVAC system 10, where chemical/gas sensor system(s) 52 and nuclear/radiation sensor system(s) 53 located in inlet air duct 21 is illustrative. It should be understood that whenever a reference is made to a chemical/gas sensor system, further embodiments exist which may comprise biological agent and/or nerve agent sensors. As shown in FIG. 1, and in accordance with one or more such embodiments of the present invention, nuclear/radiation sensor system 53 is mounted on strut-type structure 55. This places nuclear/radiation sensor system 53 in the outside air stream entering inlet air duct 21 so that turbulent or laminar air flows along walls of inlet air duct 21 will not interfere with detection of radioactive isotopes by these detectors. Strut-type structure 55 is designed to limit the resistance it creates to air flow in inlet air duct 21 and return air duct 24. As further shown in FIG. 1, and in accordance with one or more such embodiments, chemical/gas sensor system(s) 52 is located in inlet air duct 21, and in accordance with one or more further such embodiments, chemical/gas sensor system(s) 52 is located adjacent to inlet air duct 21. If chemical/gas sensor system(s) 52 is located in inlet air duct 21, a sufficient amount of air will pass over chemical/gas sensor system(s) 52 so that it/they will detect any chemical/gas agents as long as the building fan system is on If the chemical/gas sensor system(s) 52 are located adjacent to inlet air duct 21, a suitable method to transfer air from inlet duct 21 must be employed to convey the air to chemical/gas sensor system(s) 52. A suitable method may be any one or a number of methods that are well known to those of ordinary skill in the art such as, for example and without limitation, drawing air using a pump, or a using bypass. Chemical/gas sensor system (s) 52 and nuclear/radiation sensor system(s) 53 are preferably placed as close to outdoor air intake 20 of inlet air duct 21 to provide the earliest possible detection of toxic agents entering building 11 from the outside.

As shown in FIG. 1, and in accordance with one or more such embodiments of the present invention, chemical/gas sensor system(s) 56 are located in (or in accordance with one or more further such embodiments of the present invention, adjacent to) duct 24 and/or duct 25 and nuclear/radiation sensor system(s) 57 are for example, and without limitation, positioned adjacent to damper 36 (as described above, damper 36 controls an amount of the building return air stream that enters economizer 23). In accordance with one or more such embodiments, chemical/gas sensor system(s) 56 and nuclear/radiation sensor system(s) 57 are located, for example, and without limitation, downstream from the last return air stream duct of building 11, and generally upstream of damper 36. Without such a placement of chemical/gas sensor system(s) 56 and nuclear/radiation sensor system(s) 57, a terrorist could release toxic materials somewhere inside building 11, the toxic materials would circulate through the entire building—by way of the building return air stream entering economizer 23—without ever passing chemical/gas sensor system(s) 52 and nuclear/radiation sensor system(s) 53 located in inlet air duct 21.

In accordance with one or more embodiments of the present invention, chemical/gas sensor system(s) 52 and 56 are chemical and/or gas sensor systems that can be enclosed in an industrial NEMA rated type enclosure such as is commonly referred to as a "Hoffman" box or unenclosed. For example, and without limitation, in accordance with one or more such embodiments, such sensor systems comprise one or more electrochemical sensors that are self powered micro fuel cells. Such individual sensors have a housing (or casing) containing a gel (or electrolyte) and two active electrodes—a working electrode (anode) and a counter-electrode (cathode). A bottom of the housing has a membrane that can be permeated by a gas sample, and it allows the gas sample to diffuse into the sensor where oxidation takes place at the anode, and reduction takes place at the cathode. As a result, a current is generated as positive ions flow to the cathode and negative ions flow to the anode. In accordance with one such embodiment, the current is sent to protection panel 60 of building protection system 50 via cabling 58 (refer to FIG. 2). In accordance with one or more further such embodiments, in place of cabling, any one of a number of communication mechanisms may be used to link sensors 52 and 56 to protection panel 60 such as, for example, and without limitation, radio frequency transmitters and receivers or line of sight infra red communication systems. In accordance with one or more such embodiments of the present invention, individual sensors are placed so that: (a) the sensor membrane is positioned downward; and (b) an air sample from a particular duct or area passes through a high efficiency filter external to chemical/gas sensor systems 52 and 56 and passes through an internal high efficiency filter, if in the sensor is in an enclosure, to protect the sensors from accumulating dust, dirt, water and other contaminants on the sensor membrane. An optimal placement of a sensor is down and perpendicular to the air stream flow, but, in the extreme, the sensor can be positioned horizontally. In dirty environments, the sensors can be fitted with dust shields or guards to further protect them from dirt and moisture. Such sensors can be selected from Building Protection Systems, Inc. of San Francisco, Calif. or from RKI Instruments, Inc., in Union City Calif., both of which provide sensors for detection in low-level concentrations of specific gases in an air stream. Typically, these sensors have extremely low false positive incidents, and provide an output current in a range between 3.6 milliamps and 4.0 milliamps when a gas to be detected is not present. The output increases from about 4 milliamps to about 20 milliamps when the sensor detects a specified chemical agent in the sample air. In the interest of safety, chemical/gas sensor systems 52 and 56 are replaced periodically to ensure that building protection system 50 will always function at an optimal level. While the output of the foregoing sensors is indicated as being between 4 and 20 milliamps, other sensors with very different outputs can be employed by simply adjusting program parameters of building protection system 50, for example, locally or remotely. In accordance with one or more embodiments of the present invention, each of chemical/gas sensor systems 52 and 56 are constructed to provide "paired" sensors (as described below). In accordance with one or more such embodiments, output signals from the "paired" sensor outputs are continuously compared by building protection system 50 to determine if the sensors are operating properly.

In accordance with one or more embodiments of the present invention, nuclear/radiation sensor system(s) 53 are placed in (or in accordance with one or more further embodiments of the present invention, adjacent to) inlet air duct 21 to intercept any radioactive isotopes that may enter the outside air stream from outside building 11 and which impact upon a face of nuclear/radiation sensor system(s) 53. In accordance with one or more such embodiments, nuclear/radiation sensor system(s) 53 can be positioned in front of or behind chemical/gas sensor system(s) 52. Similarly, nuclear/radiation sensor system 57(s) in (or in accordance with one or more further embodiments of the present invention, adjacent to) return air duct 24 is located adjacent to chemical/gas sensor system(s) 56 in return air duct 24—it can be positioned in front of or behind chemical/gas sensor system(s) 56. In accordance with one or more embodiments of the present invention, nuclear/radiation sensor systems 53 and 57 each comprise a single instrument that combines a NaI Scintillation probe with a digital pulse processor/amplifier that provides high quality detection and spectroscopic information. In accordance with one or more further such embodiments, nuclear/radiation sensor systems 53 and 57 each provides four signal outputs. A first signal output (comprising radioactive isotope identification information) is communicated directly to computer 62 (in accordance with one or more still further embodiments, the first signal output is communicated to Ethernet Hub 126 in panel 60, and from Ethernet Hub 126, it may be sent to selected computer(s) such as, for example, to computer 64 in panel 60 and/or to a computer at the remote monitoring center and/or to another computer that is located in the building in which building protection system 50 is located and/or to a computer that is remote from the building in which building protection system 50 is located). A second signal output (a count signal comprising actual radiological counts) is communicated to a VHSC (Very High Speed Counter) module in panel 60 (such a VHSC module can be purchased from Building Protection Systems, Inc or from Allen Bradley Rockwell Automation of Milwaukee, Wis.), and the VHSC module sends the count information to PLC 80. In accordance with one or more embodiments of the present invention, PLC 80 analyzes the count information, and outputs a signal to computer 64. In response, computer 64 will cause the count information to be displayed on touch screen monitor 70, for example in CPS (counts per second). Counts corresponding to a condition where there is no threat (i.e., background radiation counts that nuclear/radiation sensor systems 53 and 57 are exposed to as a result of background radiation from natural causes) may be referred to as a background level. In addition, the display will highlight count levels that are above a background level (for example, such a background level may be determined as a calibration wherein counts obtained when building protection system 50 is initially turned on are deemed to represent the background level). PLC 80 uses the count information to determine if a nuclear/radiological threat event has occurred (i.e., if the counts in CPS are above a preset alarm trigger point—a predetermined level). If so, PLC 80, in a manner previously described, triggers a shutdown of the building fan systems and dampers. A third signal output (a zero count output signal) is an alarm output signal. If the nuclear/radiation sensor system determines that the data to be provided as the second signal output equals zero, the alarm output signal is communicated directly to a separate input of PLC 80, i.e., bypassing the VHSC module. In response, PLC 80 will register a sensor fault as previously described. A fourth signal output is a rapid shutdown alarm output signal. If the nuclear/radiation sensor system (using its own determination of background and preset parameters) determines that the data to be provided as the second signal output has a very rapid, very large increase, the rapid shutdown alarm output signal is communicated directly to a separate input of PLC 80. In response, PLC 80 will immediately trigger a shutdown of the building fan systems and dampers in a manner previously described without first analyzing the second signal output ("an emergency shutdown"). At the same time, data from the first signal output can be used by a computer program at any one of several computers to identify the radioactive isotope that caused the nuclear/radiation sensor to initiate the "emergency building shut down." In this regard, and in accordance with one or more embodiments of the present invention, PLC 80 triggers an emergency shut down on detection of radiation without the need to first identify the particular radioactive agent. Thus, as described above, nuclear/radiation sensor systems 53 and 57 each provide at least two signal outputs, the second output signal (the count signal) described above, and the fourth output signal (rapid shutdown alarm output signal) described above, from a single unit, that can trigger a shutdown of the building fan systems and dampers. In accordance with one or more such embodiments, these output signals (also referred to below as dual signal outputs) are continuously monitored by building protection system 50 to determine if building protection system 50 should take action to trigger shut down a building HVAC system, in the manner previously described.

Nuclear/radiation sensor systems 53 and 57 detect decaying isotopes, and the dual signal outputs transmit a detection event by way of a hard wired cable connection to protection panel 60. In accordance with one or more further such embodiments, in place of cabling, any one of a number of communication mechanisms may be used to link sensors 53 and 57 to protection panel 60 such as, for example, and without limitation, radio frequency transmitters and receivers or line of sight infrared communication systems. For detection of nuclear/radiological agents, sensors can be obtained from Building Protection Systems, Inc. of San Francisco, Calif. or from BNC Corp. of San Rafael, Calif. With appropriate software which can be purchased from Building Protection Systems, Inc or from BNC Corp., nuclear/radiation sensor systems 53 and 57 can detect isotopes of Americium 241, Cesium 134-137, Cobalt 60, Iodine 131, Thallium, Phosphorus 32, Plutonium metal or salt 238-239, Plutonium high-fired oxides 238-239, Polonium 210, Radium 226, Strontium 90, tritium, Uranium Oxides and nitrates 238-235, Uranium High oxides hydrides, carbides, salvage ash 238-235, and depleted Uranium and Uranium Metal 238, as well as others.

In accordance with one or more embodiments of the present invention, the forgoing chemical/gas sensor systems 52 and 56 and nuclear/radiation sensor systems 53 and 57 provide a real time, quick response, envelope which is necessary to prevent contamination of building 11. Biological sensors typically require minutes, if not hours, to develop a positive signal, during which time building 11 will be completely contaminated, i.e., well before the biological contaminant is detected. If biological sensors are developed which have a response envelope in real time (more comparable to that of the chemical/gas sensors and/or nuclear/radiation sensors described above), biological sensors can be integrated into building protection system 50, at a cost proportional to the cost of such biological sensors. In this sense, building protection system 50 is scalable, even after it is installed. As such, and as one of ordinary skill in the art can readily appreciate, further embodiments of the present invention exist where the use of contaminant sensors (which detect any one of a number of contaminants) are integrated into building protection system 50 in the manner described above with respect to chemical/gas sensor systems 52 and 56 and nuclear/radiation sensor systems 53 and 57.

At the heart of building protection system 50 is panel 60 (shown in FIG. 2) which includes external communication links, for example, communication link 61 to an operator's system computer 62, and communication link 63 (also referred to as a remote monitoring connection) to a telephone line or an internet network—whereby the status of panel 60 can be monitored at a remote location. Since operator's system computer 62 provides critical information to building personnel, it is powered by an uninterruptible power supply (not shown) that provides at least one hour of operation if normal electrical supply to the building in which it is located, for example, building 11, is interrupted.

According to one or more embodiments of the present invention, the communication links are adapted to provide continuous monitoring of the status of building protection system 50 by a remote monitoring center that is staffed 365 days a year 24 hours a day, 7 days a week by live personnel who will be trained to respond should there be an indication of a system fault or alarm event by activating a predetermined reach back and/or contact protocol. The trained personnel in the remote monitoring center can also reset building protection system 50 remotely after any occurrence, for example such occurrence could be a system fault caused by a failed sensor or an actual sensor detection that resulted in the building fan system being shutdown, and the dampers closing. Such a monitoring center is located remote to the building in which the building protection system 50 is installed. In addition, and in accordance with one or more such embodiments, one or more of such communications links is also operable and programmable to communicate the same real time information that is transmitted to the remote monitoring center to local first responders such as, for example, and without limitation, Fire or Police, health officials or other governmental authorities. In addition, servicing of building protection system 50 can be performed by Building Protection Systems, Inc. or an Authorized Service Provider & Distributor ("ASP&D") where, for example, the ASP&D can provide maintenance, sensor changes and repairs.

In accordance with one or more embodiments of the present invention, a computerized log of all activity with the building protection system 50 such as, for example and without limitation, maintenance activity, repairs, events (alarms, faults, and so forth), alarm history, and system log on access is recorded in building protection system panel 60. This recorded history can also be accessed by the remote monitoring center through communications connection 63.

In accordance with one or more embodiments of the present invention, internally, panel 60 includes its own computer (not shown separately), which computer is integrated with touch screen monitor 70. This integral computer for example, and without limitation, includes a Pentium-4 2.4-3.2 GHz processor with a CD, 3.3" floppy, 1 Gigabyte of RAM, and runs Windows XP Professional as its operating system. Such an integrated computer can be obtained from Building Protection Systems, Inc of San Francisco, Calif. or CTC Parker Automation of Milford, Ohio. Software used to fabricate one or more embodiments of the present invention, which software can be obtained from Building Protection Systems, Inc or from CTC Parker Automation, can be run on this computer or on external computer 62. In accordance with one or more such embodiments, touch screen monitor 70 receives outputs from the selected computer, and provides inputs to the selected computer. In the case where the selected computer is external computer 62, these outputs and inputs are supplied and received through communication link 61 which connects computer 62 to panel 60. Typically, panel 60 is located in engineering spaces, and it is convenient to have it connected to computer 62 located in a building's operational spaces so that operators need not go to the engineering spaces to determine the status of building protection system 50.

In accordance with one or more embodiments of the present invention, a software program run by computer 62 includes data from which an identification of an agent sensed by nuclear/radiation sensor systems 53 and 57 can be made. This software program can be obtained from Building Protection Systems, Inc. model RAD or from BNC Corp model SAM 935. Typically, personnel interface the building protection system 50 through touch screen monitor 70—Human Machine Interface software is employed whether the computer selected to control building protection system 50 is computer 64 (not shown) located within panel 60 or is computer 62 located external to panel 60. This Human Machine Interface software can be obtained from Building Protection Systems, Inc. of San Francisco, Calif. or from CTC Parker Automation of Milford, Ohio. In accordance with one or more embodiments of the present invention, customization of software run on the selected computer and the Programmable Logic Controller ("PLC") used in panel 60 enables continuous monitoring of sensors, provides alarm information and system history, as well as, a means to set and/or adjust parameters of the system (locally or remotely), for example and without limitation, set points or alarm trigger points for the sensors. In addition, and in accordance with one or more embodiments of the present invention, the remote monitoring connection can be utilized to set and/or adjust system parameters (for example and without limitation, set points or alarm trigger points for the sensors) remotely. In accordance with one or more embodiments of the present invention, panel 60 contains dual Programmable Logic Controllers ("PLCs") and Input/Output modules ("I/O modules), both of which can be obtained from Allen Bradley-Rockwell Automation of Milwaukee, Wis. In accordance with one or more embodiments of the present invention, these PLCs and I/O modules receive output signals from the chemical/gas sensors and the nuclear/radiation sensors, and display information relating to these signals on touch screen monitor 70. In addition, the PLCs run software which can be obtained from Building Protection Systems, Inc. or from Allen Bradley Rockwell Automation. The software causes the PLCs to process the signals input from all the sensors and I/O modules, and to determine what actions to carry out, such as, for example and without limitation, to cause a building shutdown of HVAC system 10 fans and dampers, or to register a system fault. The PLCs communicate the information that the PLCs process by routing such information through Hub 126 to computer 64, where it will be processed so that it can be displayed on touch screen monitor 70.

In accordance with one or more embodiments of the present invention, optional, wide angle video camera 71 (or video camera system 71) is incorporated into the front of panel 60. In accordance with one or more such embodiments, video camera system 71 records video images of persons accessing panel 60 on one of the hard drive of the computer in panel 60 or a digital video recorder ("DVR") (or video storage system) in panel 60. Obviously persons desiring to attack building 11 might try to disable building protection system 50 by accessing panel 60, which attempt will be recorded and communicated to the remote monitoring center to panel 60. Video recording by video camera system 71 occurs continuously on a loop recording, but the only segment of the recorded data that is saved is the video portion which occurs shortly prior to and after the detection of an unauthorized access or detection of threat to building 11, i.e., an event. Typically when such an event occurs, the saved video data is transmitted via communication link 63 to a remote location of a company servicing building protection system 50. In addition, and in accordance with one or more further embodiments of the present invention, if desired, remote video cameras 72 can be utilized to monitor each air intake(s) 20 of building 11, and they can be connected to panel 60 via cabling 73 or other communications mechanism. Then, in accordance with one or more such further embodiments, video recording for such additional cameras is a loop recording system, and is continuous with the only segments of recorded video data being saved are those portions immediately prior to and after the detection of an event, for example and without limitation, fifteen minutes prior to an event to fifteen minutes after the event.

In accordance with one or more embodiments of the present invention, the selected operator interface computer (either the computer in panel 60 or external computer 62 connected to panel 60 by communication link 61) is programmed to treat a fault or any attempted tampering with building protection system 50 as an event, and the recorded video data can be employed to determine if the event resulted from tampering with panel 60 or detection of a threat by the sensors. If the PLCs determine that the sensors have detected a real chemical/gas or nuclear/radiation attack, the selected computer will record the event on the digital video recorder.

As was described above, in accordance with one or more embodiments of the present invention, chemical/gas sensor systems (like each of chemical/gas sensor systems 52 and 56) are installed in pairs so that there are two sensors for each type of gas to be monitored, and both sensors of a pair of sensors are connected to panel 60 through wiring or through other communication mechanisms. Software in the PLCs in panel 60 compares output from these "paired sensors." If a significant deviation occurs between their respective outputs (referred to as a lack of output parity), a "fault" is deemed to exist. In accordance with one or more such embodiments, the existence of a "fault" is determined by the PLC software. The PLC then sends a signal to: (a) the computer in panel 60 which, in turn, causes touch screen monitor 70 to display a system fault message; and (b) cause system fault red light 81 to be lit and to cause red LED stack light 85 to be lit (thereby causing a fault alarm in panel 60). Of course, if the outputs from these paired sensors exceed a set threshold (i.e., a predetermined level), and the outputs are in substantial parity (for example and without limitation, a system parameter), the PLC in building protection system 50 immediately signals building's control system 40 to shut down HVAC system 10 of building 11.

While chemical/gas sensor systems 52 and 56 are highly reliable, they are still subject to a false positive indication based on an individual sensor failure. Advantageously, using paired sensors to detect the same agent in accordance with one or more embodiments of the present invention, greatly reduces the potential of a false positive that could shut down a building's HVAC system; using paired sensors also provides a continuous monitor of the sensors themselves for added safety. For example, if one sensor in a set of paired sensors fails, this will result in a lack of parity in their respective outputs, and building protection system 50 will register a fault. In accordance with one or more embodiments of the present invention, building protection system 50 will display the fault on both touch screen monitor 70 and a monitor associated with remote computer 62, as well as, relay it to a remote location where building protection system 50 is being monitored. As those of ordinary skill in the art will readily appreciate, although the term pair sensors or sensor system has referred to two sensors or sensor systems, further embodiments exist where a larger number than two may be used.

As indicated, when both sensors of paired sensors have output parity, and they each indicate the presence of a toxic threat to building 11, building protection system 50 will automatically signal building control system 40 to shut down HVAC system 10 of building 11.

Figure 3:
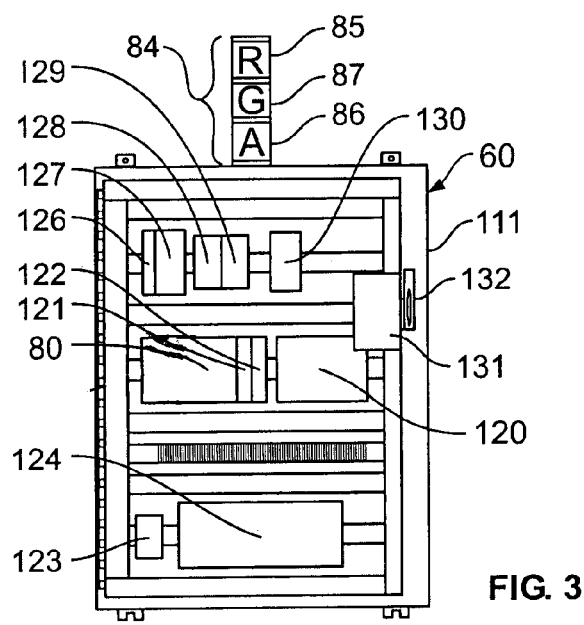
FIG. 3 is a diagram of an interior of a panel of the building protection system shown in FIG. 2.

Referring to FIGS. 1, 2 and 3, in accordance with one or more embodiments of the present invention, building 11 has chemical/gas sensor systems 52 and 56 installed in locations to be able to sample air in ducts. In accordance with one or more such embodiments, a chemical/gas sensor system comprises two sensors (a pair of sensors) for the same gas (for example and without limitation, $Cl_2$) that are contained in a chemical/gas sensor array. The chemical/gas sensor array is mounted in (or in accordance with one or more further embodiments, adjacent to) each duct in which air is to be sampled, and each of the sensor outputs are hard wired to programmable logic controller 80 ("PLC 80") within panel 60 (refer to FIG. 3) by an 18 awg twisted pair shielded cable or other suitable cabling (or in accordance with one or more still further embodiments, one or more of the sensor outputs communicate with PLC 80 using any other communication method and mechanism that are well known to those of ordinary skill in the art, including those previously mentioned). In accordance with one or more such embodiments, each such chemical gas sensor of a pair of sensors is independently wired to a separate I/O module of PLC 80. A suitable PLC is a CompactLogix L35E manufactured by Allen Bradley Rockwell Automation of Milwaukee, Wis. Additional PLCs and I/O modules can be added if more inputs/outputs are needed.

In accordance with one or more embodiments of the present invention, logic in PLC 80 compares outputs from the paired sensors connected to it for a particular toxin, gas or chemical being monitored. If the outputs from each of the paired sensors is not within a preprogrammed variance of each other, PLC 80 registers a fault, and causes RED fault light 81 on surface 110 of panel 60 to be lit. In addition, upon registering a fault because the outputs from the paired sensors have too great a variance in their compared outputs, PLC 80 simultaneously: (a) sends a signal to the computer in panel 60 (in response, the computer causes the "sensor fault" to be displayed on touch screen monitor 70); (b) sends a signal to computer 62 (in response, computer 62 causes the "sensor fault" to be displayed on its monitor); (c) using communication link 63, sends the same information to the remote location (for example and without limitation, an off site location) of the company monitoring building protection system 50, and (d) sends a signal to cause red stack light 85 to flash.

In accordance with one or more embodiments of the present invention, panel 60 has triple stack light 84 on the top thereof wherein triple stack light 84 includes top red light 85, bottom amber light 86, and middle green light 87 to provide a visual alert as to the status provided by panel 60 in an area where it is installed (refer to FIG. 2). In accordance with one or more alternative embodiments of the present invention, triple stack light 84 can be mounted in a face of panel 60 or even be placed in a remote location. Normally the green light will be lit, indicating that building protection system 50 is on line (i.e., it is armed) and working properly. If a fault occurs because one of its paired sensors has too great a variance with respect to the other's output (as discussed above), PLC 80 will cause top red light 85 to strobe (i.e., flash). In accordance with one or more embodiments of the present invention, three visual indications of a bad sensor are provided at panel 60: (a) one is provided on touch screen 70; (b) a second is provided by flashing top red light 85 on panel 60, and (c) a third is provided by red fault light 81 on panel 60 (refer to FIG. 2). In addition, and accordance with one or more embodiments of the present invention, PLC 80 will also send a sensor failure signal: (a) to a remote location of a company monitoring building control system 50; and (b) to external computer 62 located, for example and without limitation, in operating spaces of the building such as the Chief Engineer office or the security desk.

When a sensor fault is detected (as described above), in accordance with one or more embodiments of the present invention, building personnel have an option of: (a) leaving building protection system 50 on line, with an impaired ability to monitor for a particular gas monitored by the failed sensor; (b) taking no action; or (c) placing building protection system 50 in a bypass mode. In particular, in accordance with one or more such embodiments, building personnel have a bypass key, and by inserting the bypass key into bypass switch 90 of panel 60 (refer to FIG. 2) and turning it to a "bypass on" position, building protection system 50 is disconnected from building control system 40, but continues to operate and provide continuous real time information about building 11 as to any threat (for example and without limitation, chemical or radiological) via touch screen 70, the monitor of external computer 62, and at a remote monitoring location. Thus, in a "bypass on" position, building operators can still shut down HVAC system 10 if a threat is detected and registered as described. In accordance with one or more such embodiments, such a "bypass on" position will also cause amber LED 91 on panel 60 (refer to FIG. 2) to light, thereby indicating this status of building protection system 50, i.e., that building protections system 50 is not capable of automatically causing a shut down of HVAC system 10. In accordance with one or more such embodiments, in the "bypass on" position, the bypass key used to switch to the bypass mode is locked in bypass switch 90 until bypass switch 90 is returned to a "bypass off" position. In accordance with one or more such embodiments, when in the "bypass on" position, and if optional video camera 71 has been installed, building protection system 50 treats this as an event, and the recorded video data from wide angle camera 71 in panel 60 is saved, thereby providing a record of access to bypass switch 90 in a DVR. In addition, building protection system 50 will cause amber light 86 on top of panel 60 (refer to FIG. 3) to be lit, thereby indicating that the "bypass on" position of bypass switch 90 has been selected.

However, in accordance with one or more embodiments of the present invention, if building protection system 50 in not in the "bypass on" position mode, and a single sensor fails, building protection system 50 is still capable of detecting all other agents in the inlet air and return air streams for which it has sensors, and it can cause a shut down of HVAC system 10 of building 11 if such other agents are detected and pose a threat to building 11.

Assume that chemical/gas sensor system 52 (inlet air sensors) or chemical/gas sensor system 56 (return air sensors) detects an agent, and the respective outputs of the paired sensors for sensing such agent are in parity (for example and without limitation, within an allowable variance of plus or minus 10%). In response, and in accordance with one or more embodiments of the present invention, building protection system 50 will indicate a threat to building 11 when the respective outputs are above a preset level (for example and without limitation, normally above between 4 to 20 milliamps, refer to the description of a particular embodiment above). As previously noted and in accordance with one or more embodiments of the present invention, a software program in PLC 80 verifies the presence of a toxic agent, and PLC 80 will send an emergency shutdown signal to building control system 40. As previously noted, and in accordance with one or more embodiments of the present invention, a separate program is added to building control system 40 so that whenever the emergency shut down signal is received from PLC 80 over communication link 51, the separate program, in building control system 40, causes a shut down of HVAC system 10. In accordance with one or more embodiments of the present invention, dual alarm safety relays located in panel 60 are connected to dry contacts in building control system 40. Depending on the type of building control system 40, the alarm safety relays in panel 60 can either open or close whenever PLC 80 sends a shutdown signal thereto. In response, a control circuit in building control system 40 that monitors the dry contacts will cause the separate program to start, which program, in turn, causes HVAC system 10 to shut down according to the program. As one of ordinary skill in the art will readily appreciate, further embodiments exist where building protection system 50 can communicate with building control system 40 using any other communication method and mechanism that are well known to those of ordinary skill in the art, including those previously mentioned. Advantageously, in accordance with one or more embodiments of the present invention, building protection system 50 can affect the HVAC shutdown in the previously mentioned manner without interfering with existing building control system 40 resident control system programming.

In accordance with one or more embodiments of the present invention, concurrently with sending the emergency shut down signal to building control system 40, PLC 80 sends a signal to triple stack light 84, which signal will cause RED stack light 85 to be lit in a steady mode, and green light 87 will remain steadily on, thereby indicating that building protection system 50 is still fully operational and will respond to further events, for example, detection of chemical or radiological events. In addition, PLC 80 sends an output signal to: (a) the computer in panel 60 that operates touch screen 70 to cause a flashing "Emergency Shutdown In Progress" to appear on touch screen 70; (b) computer 62 in the operation spaces to cause it to display a flashing "Emergency Shutdown In Progress" on the monitor; and (c) equipment at a remote monitoring location. Then, in accordance with one or more embodiments of the present invention, until building protection system 50 is reset by authorized personnel utilizing a reset key in system switch 92 in panel 60 (refer to FIG. 2), building protection system 50 will continue to indicate a shut down of HVAC system 10. Alternatively, building protection system 50 can be reset from a remote monitoring location, using an appropriate password and following a set of instructions.

In accordance with one or more alternative embodiments of the present invention, a variable frequency drive (VFD) is added to all rotating fans in HVAC system 10. Its purpose is to stop rotation (kinetic energy) of the fans as quickly as possible during an emergency building shut down. This feature may be operated by building control system 40 upon its receiving the signal from building protection system 50 indicating an emergency shut down, by activating the VFD's "quick stop" or "shaft stop" function. When rotation of the fans is stopped quickly, the static pressure created by the fans in HVAC system 10 will drop, thereby resulting in a small back-flow in air steams created by the fans to lessen further contamination. Also, if desired, dampers 22 and 36 can be replaced with fast acting dampers which will close in a range of about five (5) seconds verses periods in a range of about thirty (30) seconds for normal dampers, which is often the response period of normal dampers.

In accordance with one or more embodiments of the present invention, when building protection system 50 initiates an emergency shut down of HVAC system 10, it simultaneously sends such initiation information to: (a) to computer 62; and (b) a remote monitoring center. As such, all necessary personnel or authorities will be informed an emergency shut down has occurred because a foreign agent has been detected in HVAC system 10. This information enables building operators to evacuate building 11, if applicable, and also, according to established protocols, communicate the occurrence of an event and its nature to local police, fire or necessary governmental or health authorities.

In accordance with one or more embodiments of the present invention, as was described above, nuclear/radiation sensor systems 53 and 57 in (or in accordance with one or more further embodiments of the present invention, adjacent to) inlet air duct 21 and return air duct 24, respectively, are not paired with a similar sensor, as was the case for chemical/gas sensor systems 52 and 56, but each is equipped to provide at least two signal outputs: (a) the second signal output (the count signal) described above, that is used by PLC 80 to determine whether the signal output (for example, in counts per second) is above an alarm set point; and (b) the fourth signal output (the rapid shutdown alarm output signal) described above which, when received by PLC 80 will cause it immediately to trigger a building HVAC shutdown. These signal outputs are provided by the same unit. These signal outputs are in addition to a first signal output (a radioactive isotope identification information signal) described above, and a third signal (a zero count output signal) described above. These signal outputs are connected to separate input channels of PLC 80, and each signal output is monitored as follows. Failure of continued existence of the second signal output previously described results in a radiological sensor fault being registered by building protection system 50. In regard to the fourth signal, and in accordance with one or more such embodiments, typically, the fourth signal output changes from a first condition, which under normal conditions, is expected to be present continually, to a second condition to indicate a need for an emergency shut down. This radiological sensor fault will be displayed in the same manner as a fault in chemical/gas sensor systems 52 and 56 on touch screen monitor 70, on the monitor of external computer 62, and at the remote monitoring station. Because of the use of two signal outputs (i.e., the second signal and the fourth signal output), each nuclear/radiation sensor system is referred to as a "dual signal output sensor."

In accordance with one or more such embodiments, in addition to the above, PLC 80 monitors the third signal output (i.e., the zero count output signal). If PLC 80 detects a loss of the third signal output, PLC 80 concurrently: (a) sends a signal to cause RED fault light 81 on panel 60 to be lit (and to strobe until a repair is effected); and (b) sends a signal to the computer in panel 60 which, in turn causes touch screen monitor 70 to display a "system fault screen" (this indicates that there has been a radiation detector fault); and (c) sends a signal to computer 62 which, in turn causes its monitor to display a "system fault screen". In addition, PLC 80 sends a signal to the remote monitoring location indicating detection of a fault.

When a failure of a radiological sensor is discovered (as described above), in accordance with one or more embodiments of the present invention, building personnel have an option of: (a) leaving building protection system 50 on line without reliable input from the failed sensor; or (b) placing building protection system 50 in bypass mode by inserting a bypass key into bypass switch 90 and turning it to the "bypass on" position. When this is done, building protection system 50 will cause: (c) amber light 86 in triple stack light 84 (refer to FIG. 3) to be lit continuously; (b) amber LED 91 on panel 60 to be lit, thereby indicating this status of building protection system 50, i.e., that building protections system 50 is not capable of automatically causing a shut down of HVAC system 10; and (c) red stack light 85 to strobe. However, outside of disabling the automatic shut down, building protection system 50 remains active, and provides real time monitoring of HVAC system 10 for threats that will be displayed on touch screen 70 and several monitors located remote to panel 60. If a threat occurs when building protection system 50 is in the "bypass on" position, building operators can manually shut down HVAC system 10.

As was described above, system switch 92 can only be accessed by authorized service personnel and has multiple positions for servicing building protection system 50. In accordance with one or more embodiments of the present invention, each position has a corresponding LED adjacent to system switch 92 wherein: amber LED 100 indicates that building protection system 50 is in system test; blue LED 101 indicates that building protection system 50 has been taken off line; and green LED 102 indicates that building protection system 50 is armed (i.e., it is on line).

In accordance with one or more embodiments of the present invention, other LEDs on panel 60 provide further information on the status of building protection system 50. In particular, green LED 103 indicates that panel 60 has electrical power; green LED 104 indicates that PLC in panel 60 are functioning properly; and green LED 105 indicates that an uninterruptible, 120 volt, power supply ("UPS") is operating properly. Using information provided by these LEDs, and by using system switch 92 to access the several switch positions, authorized personal having a key for system switch 92 can monitor the operation of panel 60 and reset its functions.

In accordance with one or more embodiments of the present invention, panel 60 is housed in a commercial unit such as, for example and without limitation, a Hoffman type 12 enclosure having door 110 that forms a front of panel 60 and which is hinged to box portion 111 of panel 60 along one side (refer to FIG. 2). Lockable latch 112 is disposed on a side opposite to the hinge—electrical codes prevent the latch from being locked.

FIG. 3 is a diagram of an interior of panel 60 of building protection system 50—FIG. 3 is illustrative and shows basic components. As one of ordinary skill in the art can readily appreciate, the actual number and type of components can vary based on the size of building protection system 50. As shown in FIG. 3, panel 60 comprises PLC 80 which has input/output modules (I/O modules) 121 and 122 that are hard wired to chemical/gas sensor systems 52 and 56 as well as to nuclear/radiation sensor systems 53 and 57. In accordance with one or more embodiments of the present invention, a PLC has modules such as I/O modules that are interfaced to such sensors. As will be readily appreciated, while this specification only describes the operation of a single set of paired gas or chemical sensors and radiological sensors with paired output signals, in embodiments used in the real world, there will be a plurality of paired gas or chemical sensors like chemical/gas sensor systems 52 and 56 connected to the I/O ports which match the spectrum of the toxic agents to be detected by building protection system 50. Likewise the output signals from radiological sensors like nuclear/radiation sensor systems 53 and 57 are connected to the I/O modules.

In accordance with one or more embodiments of the present invention, the PLCs are powered by 24 volt power supply 123 that is, in turn, powered by uninterruptible, 120 volt, power supply 124 (UPS) that insures power to the components of panel 60 for at least one hour in case of loss of the normal electrical supply to the building in which panel 60 is located.

In accordance with one or more embodiments of the present invention, PLC 80 is connected to Ethernet Hub 126 that enables PLC 80 to communicate with components outside panel 60 such as computer 62 and a remote monitoring station (not shown). Such communication is established through Ethernet Hub 126 and modem 127 in panel 60 in accordance with any one of a number of methods that are well known to those of ordinary skill in the art. The radiation identification signal outputs from each of nuclear/radiation sensor systems 53 and 57 are connected to Ethernet Hub 126 so that data can be sent to a selected computer, for example computer 62, or a computer at the remote monitoring center to identify the radioactive agent that has triggered the system shut down using the previously mentioned software. In addition, two alarm safety relays 128 and 129 in panel 60 enable PLC 80 in panel 60 to close or open a set of contacts, whichever is appropriate, to enable a sub-program in building control system 40 of building 11 to shut down HVAC system 10 due to detection of a threat.

In accordance with one or more embodiments of the present invention, optional digital video recorder 130 ("DVR 130") is included in the box 111 of panel 60. DVR 130 continuously records video information on a loop recording so that a segment of the loop recording occurring before an event and after the event from the loop can be saved for analysis. As previously indicated, triple stack light 84 is mounted on top of box 111, and includes red light 85, green light 87, and amber light 86. These lights and the components, are connected to one other, as appropriate, by buses or wires (not shown) in panel 60 so they will function as described. If desired, panel 60 may include 15 Amp, 3 pole circuit breaker 131 and exterior trip lever 132 to disconnect panel 60 from the regular power supply of the building to comply with electrical codes.

In accordance with one or more embodiments of the present invention, "System Fault" indicating light 81 is a RED LED light that is normally off. However, when PLC 80 determines that a fault has occurred with any of the chemical agent sensors or the radiological sensors, or internal components in panel 60, the RED LED system fault light will be lit in a steady mode, and red stack light 85 atop panel 60 will be strobed.

In accordance with one or more embodiments of the present invention, authorized personnel can place building protection system 50 in a "TEST MODE" by inserting a key in system switch 92, and turning it to the "TEST MODE." At that time, amber LED 100 will be lit in a steady mode. When in the test mode, the key will be locked in system switch 92 until system switch 92 is turned to a "System Armed" position. In accordance with one or more embodiments of the present invention, the key can also be used to turn building protection system 50 off by turning system switch 92 to a "System Off" position. At that time, blue LED 101 on panel 60 will be lit, and the key will be locked in system switch 92. As can be appreciated from the foregoing, when authorized personnel access panel 60, they cannot retrieve the key from system switch 92 until it is returned to the "System Armed" position—this avoids leaving building protection system 50 in an inoperable mode. When system switch 92 is in the "System Armed" position, green LED 102 on panel 60 will be lit, thereby indicating that building protection system 50 is on line. In addition, green light 87 in stacked light 84 atop panel 60 will be lit steadily, thereby indicating that building protection system 50 is operable.

In accordance with one or more embodiments of the present invention, when system switch 92 is turned to the "System Armed" position, building protection system 50 will go through a "self test mode" to check all of its components including, PLC 80; back up PLC 120; UPS 124; Ethernet Hub 126; modem 127; PLC I/O modules 121 and 122; chemical/gas sensor systems 52 and 56; and nuclear/radiation sensor systems 53 and 57. During this time, green light 87 will be lit in a "flashing" or strobe mode. Once the "self test mode" completes, green light 87 will be lit steadily, thereby indicating that building protection system 50 and its associated sensors are on line and operating properly.

In accordance with one or more embodiments of the present invention, touch screen 70 on panel 60 provides real time system monitoring screens at panel 60, and displays system status such as, for example and without limitation: "system off"; "self test in progress"; "power on"; "system armed"; "system fault"; and "bypass on"—as well as, the alarm status of "all clear". Of course, if one or more of the paired sensors detects a threat to building 11, touch screen 70 will display "Emergency Building Shut Down" or in case of a sensor failure, "Sensor Failure" and/or "System Fault". Other screens can be accessed by touch buttons at a bottom of touch screen 70, such as help, maintenance, status, alarm history, persons accessing system, alarm information, and so forth.

Typically panel 60 is located in engineering spaces of building 11 with the sensors located in (or in accordance with one or more further embodiments of the invention, adjacent to) air ducts remote from panel 60.

In accordance with one or more embodiments of the present invention, additional sensors, for example and without limitation, chemical sensors like chemical/gas sensor system(s) 52 and radiological detectors like nuclear/radiation sensor system(s) 53, are disposed outside building 11 and they are connected by communication links (for example and without limitation, of the types described above) with building protection system 50. If contaminants such as, for example and without limitation, chemical and/or radiological contaminants, are detected in the manner described above), then building protection system 50 will operate in the manner described above. In particular, and among other things, building protection system 50 will send a signal to building control system 40 to cause it to close the dampers and to turn off fans in building 11 to prevent the contaminants from being drawn into building 11.

It should be understood that wherever the terms chemical, chemical sensor, chemical detector or chemical sensor means are used in this specification, the term chemical means any chemical including, for example and without limitation, hazardous agents, hazardous industrial chemicals, toxic industrial chemicals, chemical warfare agents, blood or nerve agents, biological agents, combustible gas agents, oxygen or any and all other agents harmful to human life or damaging to property. Further, it should be understood that wherever the terms nuclear, radiological, nuclear sensor or detector, radiological sensor or detector, or nuclear/radiation sensor or detector, or nuclear or radiological sensor or detector means, are used in this specification, the term nuclear or radiological means any radioactive material, including those identified hereinabove.

It should be understood that wherever it is illustrated in any figures or stated in this specification that chemical sensors or nuclear/radiation sensors are located inside or adjacent to a duct this means that a sample of air from that duct is being drawn or directed to the sensors. In particular, it should be understood that the chemical sensors and nuclear/radiation sensors, could be mounted inside or outside the duct, either individually or in a manufactured assembly enclosure or in an array, and can sample air to test for chemical agents or nuclear/radiation agents either by having a building fan system cause air to pass over the sensor or by drawing an air sample to the sensor by a mechanical means or by other means familiar to an ordinary person skilled in the art or the sensor's being placed in an ambient atmospheric condition.

The embodiments of the present invention described above are exemplary. Many changes and modifications may be made to the disclosure recited above while remaining within the scope of the invention. The scope of the invention should therefore be determined not with reference to the above description, but instead should be determined with reference to the appended claims along with their full scope of equivalents.

What is claimed is:

1. A building protection system for a building having an inlet air duct with an inlet damper operable to regulate inlet air entering the building and passing through the inlet air duct, a return air duct with a return damper operable to regulate return air, and a fan system operable to circulate a mixture of the inlet air and the return air in the building, the building protection system comprising:

a chemical sensor system operable to detect one or more chemicals in the inlet air;

a chemical sensor system operable to detect the one or more chemicals in the return air;

a radiological sensor system operable to detect one or more radioactive materials in the inlet air;

a radiological sensor system operable to detect the one or more radioactive materials in the return air; and a control system in communication with the sensor systems to receive output therefrom;

the control system is operable to determine that: (a) output from any of the chemical sensor systems indicates more than a predetermined level of one or more of the one or more chemicals and (b) output from any of the radiological sensor systems indicates more than a predetermined level of one or more of the one or more radioactive materials; and the control system is operable to signal a building control system to close the dampers and to turn off the fan system whenever the control system determines that output from any of the chemical sensor systems indicates more than a predetermined level of one or more of the one or more chemicals or whenever the control system determines that output from any of the radiological sensor systems indicates more than a predetermined level of one or more of the one or more radioactive materials;

wherein the control system is operable to communicate over an operator communication link with an operator interface computer, and over a remote communication link with a remote monitoring center;

wherein: (a) the control system is operable to display information on a control system display; (b) the control system sends information displayed on the control system display over the remote communication link to the remote monitoring center; and (c) the remote monitoring center is operable to display the information; and wherein:

the information displayed on the control system display includes which sensor system and what type of sensor system detected an amount exceeding a predetermined level, a location of the sensor system as to which building and location within the building, and protocols to follow for a particular type of detection event.

2. A building protection system for a building having an inlet air duct with an inlet damper operable to regulate inlet air entering the building and passing through the inlet air duct, a return air duct with a return damper operable to regulate return air, and a fan system operable to circulate a mixture of the inlet air and the return air in the building, the building protection system comprising:

a chemical sensor system operable to detect one or more chemicals in the inlet air;

a chemical sensor system operable to detect the one or more chemicals in the return air;

a radiological sensor system operable to detect one or more radioactive materials in the inlet air;

a radiological sensor system operable to detect the one or more radioactive materials in the return air; and a control system in communication with the sensor systems to receive output therefrom;

the control system is operable to determine that: (a) output from any of the chemical sensor systems indicates more than a predetermined level of one or more of the one or more chemicals and (b) output from any of the radiological sensor systems indicates more than a predetermined level of one or more of the one or more radioactive materials; and the control system is operable to signal a building control system to close the dampers and to turn off the fan system whenever the control system determines that output from any of the chemical sensor systems indicates more than a predetermined level of one or more of the one or more chemicals or whenever the control system determines that output from any of the radiological sensor systems indicates more than a predetermined level of one or more of the one or more radioactive materials;

wherein the radiation sensor systems can detect and identify more than 100 radioactive isotopes; and wherein:

the control system simultaneously transmits a first report and a second report to a remote monitoring center; wherein: the first report identifies a radioactive isotope that was detected and an amount of energy associated therewith; and the second report containing the same information in a "spectral header file" format.

* * * * *